No. 695,625. Patented Mar. 18, 1902.
F. E. ROACH.
CROWN SOLDERING PLIERS.
(Application filed May 20, 1901.)
(No Model.) 2 Sheets—Sheet 1.
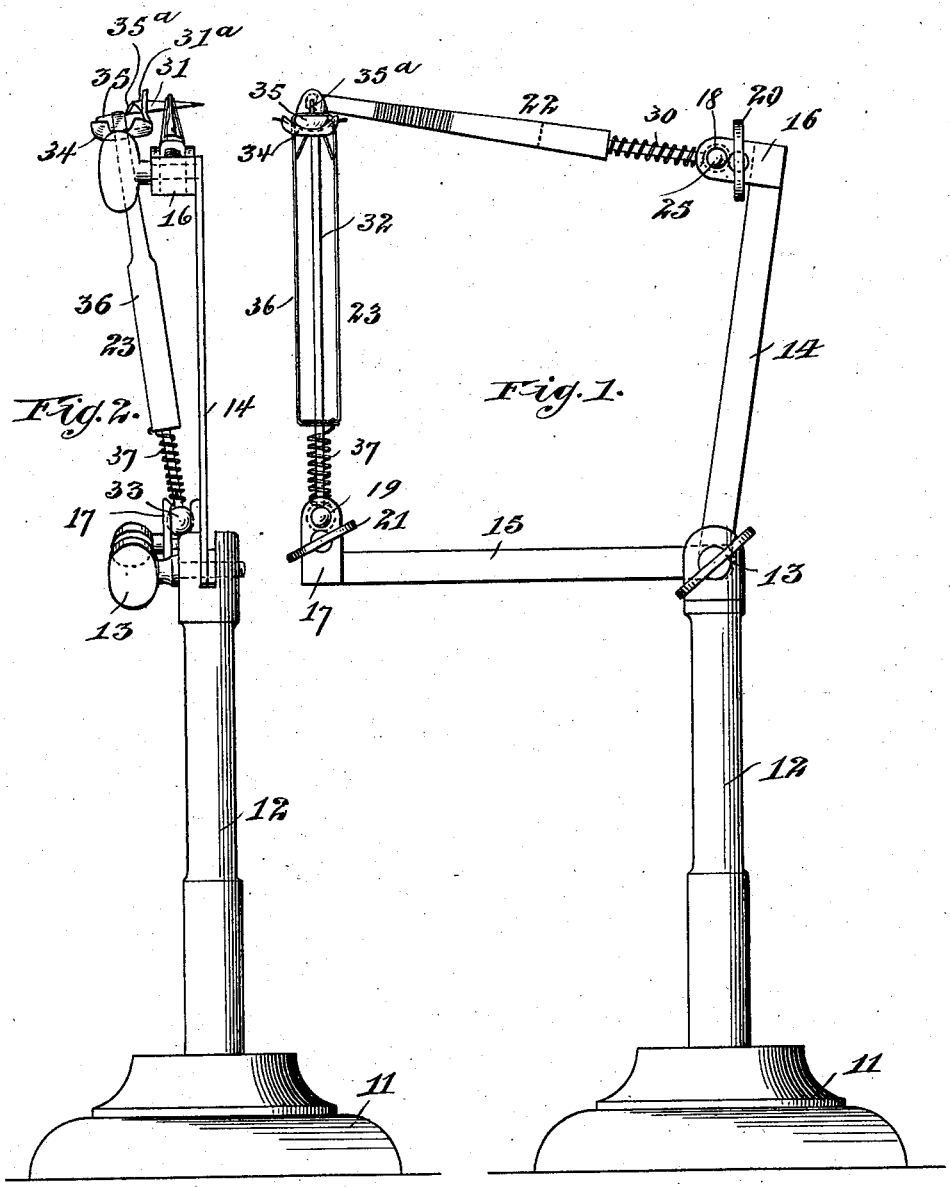
Witnesses,
Inventor,
Jims E. Roach
By Offield, Towle & Linthicum
Atty's.

No. 695,625. Patented Mar. 18, 1902.
F. E. ROACH.
CROWN SOLDERING PLIERS.
(Application filed May 20, 1901.)
(No Model.) 2 Sheets—Sheet 2.
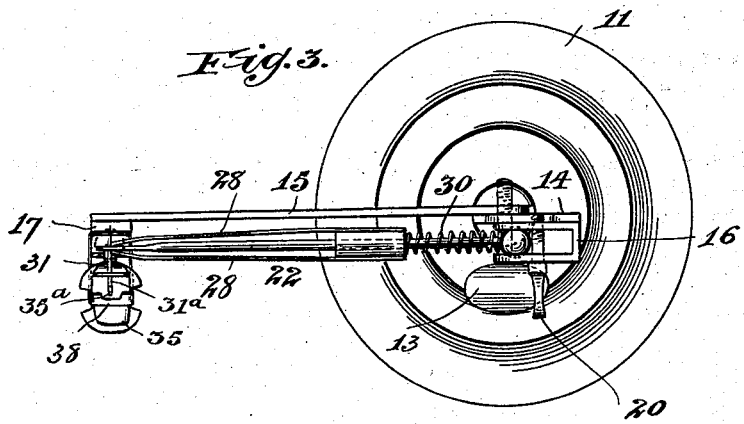
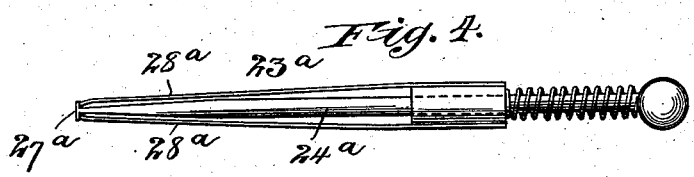
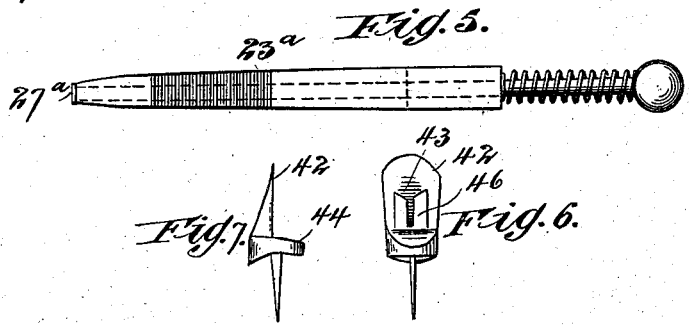
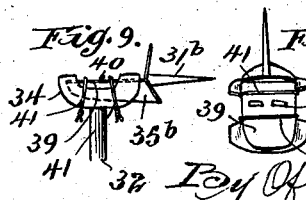
Witnesses,
J. S. Manni;
S. N. Pond.
Inventor,
Finis E. Roach
By Offield, Towle & Linthicum
Attys.
THE NORRIS PETERS CO., PHOTO-LITHO., WASHINGTON, D. C.

UNITED STATES PATENT OFFICE.

FINIS E. ROACH, OF CHICAGO, ILLINOIS.

CROWN-SOLDERING PLIERS.

SPECIFICATION forming part of Letters Patent No. 695,625, dated March 18, 1902.

Application filed May 20, 1901. Serial No. 61,068. (No model.)

*To all whom it may concern:*

Be it known that I, FINIS E. ROACH, of Chicago, Illinois, have invented certain new and useful Improvements in Crown-Soldering Pliers, of which the following is a specification.

My invention relates to devices for facilitating the soldering together of certain parts of artificial teeth; and has for its principal object to shorten the operation of securing together such parts as now commonly practiced by doing away with one of the steps of said operation which has heretofore required a considerable expenditure of both time and labor.

More specifically, the object of the present invention is to facilitate the soldering together of the coping and the crown portion of an artificial tooth, and this is done in my present invention by means of a device which holds the said parts during this soldering operation in exactly the relative positions in which they have previously been temporarily secured, as by waxing the said parts together.

The ordinary artificial or crown tooth comprises two principal parts—the post with the coping and the body or crown portion. After having ascertained the true relative positions of these parts with respect to each other and to the contiguous teeth by means of a model made from an impression in the well-understood way the said parts are temporarily secured in such relation by waxing the same together, after which the said parts are invested in asbestos and plaster-of-paris or other suitable investing material, the waxed surface being left exposed, and are then subjected to a high heat, which operation melts away the wax and thoroughly dries out the parts, leaving them firmly held by the investing material in the same relative positions in which they were formerly held by the wax. The parts are then secured and permanently soldered together. This process of investing the temporarily-united parts of the tooth preparatory to permanently securing them together involves a considerable expenditure of both time and labor, and to the extent of the time required to carry it out delays the completion of the process of manufacture.

In my present invention I have produced a delicately adjustable mechanism designed to take the place of the investment hereinabove referred to and to facilitate the soldering together of the parts of an artificial tooth in an equally efficient way and in a much shorter period of time than by the old process.

To this end my invention consists in a device in the nature of pliers, the two holding-arms of which are in use capable of a universal and automatic adjustment relatively to each other and to the elements of the tooth carried thereby, all as hereinafter described, and more particularly pointed out in the claims.

My invention is illustrated in the accompanying drawings, in which—

Figure 1 is a side elevational view of my invention, showing the same in operative engagement with the post and crown portion of an artificial tooth. Fig. 2 is an edge elevation of the same viewed in a plane at right angles to that of Fig. 1. Fig. 3 is a plan view of the parts as they appear in Figs. 1 and 2. Figs. 4 and 5 are edge and side views, respectively, of a special form of holding-arm designed to coöperate with a special construction of backing for the crown. Figs. 6 and 7 are front and edge views, respectively, of the special form of crown-backing designed to coöperate with the holding-arm shown in Figs. 4 and 5. Fig. 8 is a longitudinal sectional view of the other arm of the pliers, which is designed to coöperate with the post or shank of the tooth; and Figs. 9 and 10 are details showing in elevation and plan, respectively, a means whereby my invention is adapted for use in connection with another special form of crown.

Referring to the drawings, 11 designates a suitable base or support, in which is fixed a post or standard 12, in the upper end of which latter are pivoted and adjustably clamped, as by means of a thumb-clamp 13, a pair of arms 14 and 15. In the normal operation of the device the arms 14 and 15 will be secured in positions substantially at right angles to each other, the arm 15 being approximately horizontal and the arm 14 approximately vertical; but the relative location of these arms is by no means fixed, but the same are capable of adjustment to any angle relatively to each other and to the standard 12 that may best suit the requirements of each particular case.

Upon the ends of the arms 14 and 15 are secured or formed integral U-shaped socket-pieces 16 and 17, respectively, such socket-pieces being made of some elastic metal, as steel, and having formed through the free ends of their parallel side members apertures 18 and 19, respectively. A pair of thumb-clamps 20 and 21 extend transversely through the side members of said socket-pieces 16 and 17, respectively, at points between the closed and open ends of said socket-pieces and serve to draw the side members thereof toward each other when desired, as hereinafter more particularly described.

22 and 23 designate a pair of spring-controlled holding-arms for supporting the post and the crown portion of a tooth, respectively, at any desired angle and in any desired relation to each other. Referring first to the construction of the arm 22, a sectional detail of which is shown in Fig. 8, 24 indicates the main shank or stem of this arm, the stem terminating at one end in a ball or sphere 25, of polished steel or other hardened metal, and at its opposite end being flattened, as at 26, and having formed therethrough an elongated slot 27. A pair of flat longitudinally-movable clamping-arms 28 are at their inner ends secured to or formed integral with a block 29, longitudinally apertured and having a sliding engagement with the shank 24 of the arm. The said arms 28 are disposed approximately parallel and have their outer ends squared, as shown, and bent inwardly to engage the opposite sides of the flattened portion 26 of the shank 24. A spiral spring 30, surrounding the shank 24 between the ball 25 and the opposed end of the bearing-block 29, normally tends to force the connected clamping-arms 28 outwardly relatively to the shank 24.

From the foregoing construction of the holding-arm 22 it will be obvious that by retracting the clamping-arms 28 against the tension of spring 30 and then introducing a member, such as the post 31 of an artificial tooth, through the receiving-slot 27 and subsequently permitting spring 30 to force the arms 28 again forward on shank 24 such post will be securely clamped and held in a position substantially at right angles to the holding-arm, as shown in Fig. 3. The holding-arm 22 thus constituted is secured in the socket-piece 16, with its ball or sphere 25 clamped between the arms of said socket-piece and engaging the edges of the oppositely-disposed apertures 18 therein in such a manner as to provide a universal swivel-joint, whereby the arm 22 may be set or may automatically adjust itself conformably to the position of the element carried thereby at any desired angle and in any desired plane relatively to its pivotal point as a center and may then be secured fixedly in such position by a simple turn of the thumb-screw 20.

The other holding-arm 23 of the device possesses a function similar to that already attributed to the arm 22, except that it is designed to support the body or crown portion of the tooth or an element thereof rather than its post, and possesses a somewhat-modified structure to adapt it to this particular purpose. I have shown said arm as constructed in three different forms in order to adapt the same to the holding of as many different varieties of crowns. In the form shown in Figs. 1, 2, and 3 this arm comprises a principal shank or stem 32, provided at its lower end with a ball or sphere 33, whereby it has a universal bearing between the parallel side members of the socket-piece 17 in the manner already described in connection with arm 22 and at its outer free end carrying a suitable cup or concave plate 34, which latter is designed and adapted to receive and have seated therein the facing of the crown portion 35 of the tooth. In order to securely hold the part 35 of the tooth to its seat in the cup 34 during the soldering operation, I provide a longitudinally-adjustable flat metal loop 36, the lower end of which slidingly engages stem 32 and has secured thereto one end of a tensile spring 37, the other end of which is anchored in the base of the stem 32, adjacent its ball-joint 33. By the mechanism described the loop or frame 36 may be readily forced outwardly upon the stem 32 a sufficient distance to enable the facing 35 of the tooth to be inserted between the outer end of the loop 36 and the cup 34, whereupon the spring 37 will then act to draw the loop 36 inwardly upon the stem 32, thereby securely clamping the facing of the tooth to its seat in the cup, all as plainly shown in Figs. 1, 2, and 3.

The operation of the mechanism as thus far described is as follows: The true relation of the facing 35 and the post 31 having been determined and the said parts having been temporarily united in such relation by wax or a similar temporary binding agent, the tooth is first seated and secured in the cup 34 in the manner already described. During this operation the arms 14 and 15 are loose on their pivot-pin in post 12 and the ball-joint 33 is loose in its socket, permitting the arm 23 to assume any desired position. The other arm 22 being also loosely jointed, clamping-arms 28 are retracted and the slotted end of said arm is passed over the free end of post 31, as shown in Fig. 2, the square ends of the arms 28 being then carried and pressed into engagement with the proximate side of the post 31, thereby securely holding said post in a fixed relation to the arm 22, all as shown in Figs. 2 and 3. It will be observed that in this operation no strain whatever is brought upon the temporarily-united parts of the tooth by reason of the fact that during this operation of securing the parts 35 and 31 in the receiving and holding devices at the extremities of arms 23 and 22, respectively, the said arms are perfectly free to adjust themselves automatically with a fine degree of exactness and delicacy to just such positions as they should occupy in order to hold the two parts of the tooth in exactly the relation to each other in which they have been previously temporarily secured without the slightest tendency to strain or disrupt the temporary union of such parts. The two members of the tooth having been thus placed and secured in the arms of the pliers, the latter are fixedly secured in the proper relative positions to each other, as already determined in the manner just described, by simply turning up the thumb-screws 13, 20, and 21. The two parts of the tooth are now as safely and securely held in true relation to each other as they would be if they had been invested in the usual way. The oxyhydrogen flame from the blowpipe being then applied to the tooth, the temporary securing agent is quickly melted and dried out, and the permanent solder may then be applied, thus permanently securing together the crown and coping of the tooth.

In the case of the all-porcelain crown, such as is intended to be shown in Figs. 1, 2, and 3, the latter is ordinarily united to the base of the post or coping through the agency of one or more pins baked into the facing, the upper ends of said pins projecting slightly above the rear surface of the facing, as indicated at 35ª in Figs. 2 and 3, and these projecting ends of said pins are secured by a drop of solder to the contiguous end 31ª of the post or coping 31. This joint is subsequently buried in a porcelain body subsequently filled in upon the back of the facing and completely covering and concealing the soldered union of the parts, and through the combined effect of the soldered junction and the porcelain filling enveloping the same the complete crown and post are securely and permanently united.

An application of my invention to the building up of a different form of tooth is illustrated in Figs. 9 and 10. In this form 31ᵇ indicates the post and coping, and 35ᵇ indicates the porcelain facing, which latter may be permanently soldered to the coping and post in the manner already described; but in this case it is desired to form a solid metal backing coextensive, or practically so, with the rear surface of the facing. In this case the rear or inner surface of the facing has applied thereto a thin plate of platinum, gold, or other suitable material 39, which latter is united to the facing by one or more small pins 40, anchored in the facing and extending through holes in the platinum plate and being bent thereover, thus binding the facing and the plate together. In view of the fact that the metal filling or backing is to be coextensive with the rear surface of the crown it is of course impossible to use the closed loop 36 as a means for holding the tooth in the cup 34. In this case, therefore, I dispense entirely with the loop 36 and employ in place thereof one or more turns of a fine gold or platinum wire 41, passing around the facing and the cup and having their ends united, as by twisting or otherwise. The necessary heat being then supplied, the solid metal filling or backing may readily be built up, covering the plate 39 and the holding-wires 41, after which the latter may be cut or unwound and the built-up tooth removed to be trimmed and polished, leaving the buried portions of the wire 41 to form an integral part of the metal backing.

In Figs. 4 and 5 I have illustrated a special form of holding-arm (designated as a whole by 23ª) and designed to take the place of the holding-arm 23 and specially adapted for coöperation with a special form of backing, as shown in Figs. 6 and 7, which backing is constructed in the manner set forth in Letters Patent No. 651,388, heretofore granted to me on the 12th day of June, 1900. Referring first to the special form of backing shown, it will be observed that this backing consists of the metal plate 42, slightly concave on its inner surface, as at 43, and having a lateral extension 44 at its inner end constituting a base, which is designed to be soldered to the coping and post. To the inner concave face of the backing 42 and approximately centrally thereof is secured a fastening device in the nature of a thin slotted plate 46, so disposed relatively to the concave portion of the backing 42 as to provide for the insertion between said parts and through the slot of plate 46 of a headed metal lug anchored in the matching face of the facing or front portion of the tooth, all as fully set forth in my former patent above referred to. In order to hold this form of backing in proper relation to the post and coping during the soldering operation instead of supporting the same in the cup 34, as hereinbefore described, I dispense with the latter and form the holding-arm 23ª in all respects similar to the arm 22, except that instead of slotting the flattened end of the stem 24ª I provide the latter with a head 27ª, disposed transversely of the stem, which head is adapted to engage the backing 42 of the tooth in rear of the slot of the plate 46 and to be securely held in fixed relation thereto by the outer ends of the spring-pressed clamping-arms 28ª engaging the face of plate 46. By the mechanism last described the backing and the post of this particular form of tooth may, after having been temporarily united by wax or otherwise, be held by the pliers in true relation to each other in a manner similar to that already described, while the temporary binding agent is melted off and the permanent binding-soldering applied, after which the permanently-united parts may be removed from the pliers and the porcelain or other facing applied through the registration of its headed lug with the slotted plate 46 in the manner set forth in my former patent above referred to.

A noteworthy feature of the mechanism herein disclosed resides in the fact that the springs 30 and 37 are located at a safe distance from the point of application of the heat, so that their temper and elastic properties are not injured thereby. The feature of prime importance, however, and which I regard as comprising the gist of my present invention resides in the provision of the two holding-arms so mounted that they are perfectly free to automatically assume any desired relative position with respect to each other that may be demanded by the particular relative position of the temporarily-united portions of the tooth and may be applied to the latter to hold the same in such relative position during the operation of permanently uniting the parts without any strain tending to disrupt the temporary union of said parts.

While it is true that in securing the temporarily-united tooth in the arms of the pliers the latter are set at substantially the proper relative angle and in substantially the proper relative positions by the operator, nevertheless the action of the springs which move the clamps in coöperation with the actual engagement of the outer ends of the clamps with the elements of the tooth results in an automatic setting or adjustment of the two arms by virture of the universal joints in just such relative positions and at just such an angle that the elements of the tooth are held by the arms without the slightest strain tending to disrupt them, and when the arms have thus automatically set or adjusted themselves in the manner and by the means just mentioned the clamping-screws are operated to effect the rigid holding of the elements of the tooth in the exact positions and relation to each other in which they have previously been temporarily secured. This action is what is referred to by the term "automatic" as applied to the adjustment of the arms.

A further noteworthy advantage resulting from the herein described and illustrated construction of said holding-arms resides in the fact that the holding or clamping strain on the longitudinally-slidable clamps is wholly in a direction longitudinally and not transversely thereof. This is important because of the fact that in the soldering operation the said longitudinally-slidable clamps, and particularly the outer ends thereof, are subjected to a great heat, which by temporarily removing their temper and rigid quality disqualifies them from resisting a transverse tension or strain, but does not impair their efficiency to transmit the longitudinal clamping thrust imparted by the springs 30 and 37. Moreover, each arm of my improved pliers contacts with the object held at three points instead of at only two, as in this class of pliers now in common use, thereby holding the article operated on more securely than heretofore. My invention therefore provides an effective substitute for the operation of investment already referred to, which latter is a long and tedious operation, and hence expensive, by reason of its demand upon the operator's time and attention. My invention very materially shortens the time required for the complete building up of an artificial tooth and performs this operation in a manner fully as effective as the old method of investment.

My invention may obviously be modified to a considerable extent as to structural details without departing from the spirit and principle thereof, and it is obviously capable of use in other relations than that specifically hereinabove described—as, for instance, by jewelers and other artisans the character of whose trade or employment requires the use of holding-pliers of this general type. I do not wish, therefore, to limit myself to the precise details of structure herein shown and described except in so far as the same may be made the subject of specific claims.

I claim as my invention—

1. A pair of soldering-pliers, comprising in combination a supporting-standard, a pair of arms pivotally clamped in said standard, a pair of holding-arms swiveled on universal joints in said first-named arms, and spring-actuated longitudinally-movable clamping devices carried on said holding-arms, whereby two elements that are to be permanently united as by solder may be securely held in proper relative positions during the soldering operation, substantially as described.

2. A pair of soldering-pliers, comprising a supporting-standard, a pair of arms pivotally clamped in said standard, a pair of holding-arms swiveled on universal joints in said first-named arms and adapted to be fixedly clamped therein, suitable receiving devices on the outer ends of said holding-arms, and longitudinally-slidable clamps carried by said holding-arms respectively and coöperating with said receiving devices to hold in proper relative positions two elements that are to be permanently united by soldering or otherwise, substantially as described.

3. A pair of soldering-pliers for permanently uniting two elements of an artificial tooth, comprising in combination a standard, a pair of arms pivotally clamped in said standards, a pair of holding-arms mounted on universal joints at the outer extremities of said first-named arms, appropriate devices on the extremities of said holding-arms for receiving the elements to be united, longitudinally-slidable clamping devices on said holding-arms respectively, and springs located at the inner extremities of said holding-arms adjacent the swiveled joints thereof and actuating the clamps to effect a coöperation between the latter and the receiving devices in firmly holding the parts of the tooth to be joined, substantially as described.

4. In an instrument of the character described, the combination with a pair of suitably-supported and universally-swiveled holding-arms, one of said arms at its free end being adapted to receive the post of an artificial tooth, and the other to receive an element of the crown, of longitudinally-slidable spring-actuated clamping devices mounted on said arms, the outer extremities of said clamping devices engaging and holding said post and crown portions of the tooth in proper relative positions for the application of a permanent binding agent thereto, substantially as described.

5. In an instrument of the character described, the combination with a pair of suitably-supported and universally-swiveled holding-arms, one of said arms being slotted at its outer end to receive the post of an artificial tooth, and the other arm being headed at its outer extremity to engage a coöperating fastening device formed on the crown portion of the tooth, of a pair of longitudinally-slidable clamping devices mounted on said arms respectively, and a pair of springs mounted on said arms between their swivel-joints and the inner ends of the clamping devices respectively and operating to thrust the latter outwardly and cause their outer ends to engage and firmly hold said post and crown portions of the tooth, substantially as described.

6. In an instrument of the character described, the combination with a standard and a pair of arms adjustably pivoted therein so as to occupy any desired angular relation to said standard and each other, of socket-pieces formed on the outer ends of said arms respectively, a pair of holding-arms, universally swiveled in said socket-pieces respectively, and clamping devices applied to said socket-pieces whereby said holding-arms may rigidly be held in predetermined positions in said socket-pieces, substantially as described.

7. In an instrument of the character described, the combination with a standard and a pair of arms adjustably pivoted therein so as to occupy any desired angular relation to said standard and each other, of socket-pieces formed on the outer ends of said arms respectively, a pair of holding-arms universally swiveled in said socket-pieces respectively, clamping devices applied to said socket-pieces for securing said holding-arms fixedly therein, and a pair of longitudinally-movable connected spring-pressed clamping-arms disposed in approximately parallel relation on opposite sides of each holding-arm and adapted to perform their functions solely through an endwise thrust thereon, substantially as described.

FINIS E. ROACH.

Witnesses:
SAMUEL N. POND,
FREDERICK C. GOODWIN.